(12) United States Patent
Barbarossa et al.

(10) Patent No.: US 7,044,648 B1
(45) Date of Patent: May 16, 2006

(54) METHOD AND APPARATUS FOR A FIBER OPTIC HOUSING AND ALIGNING DEVICE

(75) Inventors: Giovanni Barbarossa, Saratoga, CA (US); Xingzhong Zhao, Newark, CA (US); William Z. Guan, Union City, CA (US); Ming Li, Pleasanton, CA (US); Di Yang, Fremont, CA (US); Xiaojun Wang, Fremont, CA (US)

(73) Assignee: Avanex Corporation, Fremont, CA (US)

( * ) Notice: Subject to any disclaimer, the term of this patent is extended or adjusted under 35 U.S.C. 154(b) by 183 days.

(21) Appl. No.: 10/642,050

(22) Filed: Aug. 15, 2003

Related U.S. Application Data (60) Provisional application No. 60/439,380, filed on Jan. 10, 2003.

(51) Int. Cl.
*G02B 6/32* (2006.01)
*G02B 6/36* (2006.01)

(52) U.S. Cl. .......................... 385/61; 385/52; 385/34; 385/91; 385/93

(58) Field of Classification Search .................. 385/52, 385/88, 90–93, 136, 137, 139, 33, 34, 61
See application file for complete search history.

(56) References Cited

U.S. PATENT DOCUMENTS

| | | | | |
|---|---|---|---|---|
| 4,997,254 | A | * | 3/1991 | Ganev .......................... 385/90 |
| 5,095,517 | A | * | 3/1992 | Monguzzi et al. ............. 385/90 |
| 5,347,605 | A | * | 9/1994 | Isaksson ....................... 385/92 |
| 6,087,621 | A | * | 7/2000 | Kang et al. ............. 219/121.64 |
| 2002/0179792 | A1 | | 12/2002 | Wu et al. |
| 2003/0095755 | A1 | * | 5/2003 | Vaganov et al. ............... 385/88 |
| 2003/0123808 | A1 | * | 7/2003 | Smith et al. ................... 385/53 |

\* cited by examiner

*Primary Examiner*—John D. Lee
*Assistant Examiner*—Omar Rojas
(74) *Attorney, Agent, or Firm*—Patterson & Sheridan (57) ABSTRACT

The present invention discloses an apparatus and method for a fiber optic housing and aligning device. A fiber optic housing and aligning device in accordance with the present invention comprises a housing, a directionally adjustable tubular casing that is mechanically coupled to a wall of the housing, and a collimator disposed within the directionally adjustable tubular casing, wherein the adjustable tubular casing comprises a convex spherical cap surface that mates with a concave seating surface of an opening within the wall and wherein the spherical cap surface may be attached to the housing by laser welding or by epoxy.

10 Claims, 10 Drawing Sheets

METHOD AND APPARATUS FOR A FIBER OPTIC HOUSING AND ALIGNING DEVICE

RELATED U.S. APPLICATION DATA

This application claims priority from U.S. Provisional Application Ser. No. 60/439,380, filed on Jan. 10, 2003.

This application relates to a co-pending application, U.S. patent application Ser. No. 10/163,405 entitled "Stable Mechanical Devices for Precision Optical Alignment and Packaging", filed on Jun. 5, 2002, owned by the assignee of this application and incorporated herein by reference.

FIELD OF THE INVENTION

The present invention relates to mounting, positioning and aligning apparatuses utilized within fiber optic communications systems to transfer optical signals between optical fibers and other optical components.

BACKGROUND OF THE INVENTION

Optical fibers are used extensively in telecommunications systems. The light-carrying core of a typical single-mode optical fiber used in optical communications systems is exceedingly small—on the order of 8 µm in diameter. Further, typical optical fibers comprise a limited numerical aperture, which defines a limited spherical angle within which light emanating from the fiber propagates or from which light may be effectively delivered into the fiber.

Generally, optical signals delivered from optical fibers must be optically coupled to many types of optical components, such as filters, interferometers, beam splitters, etc. within optical fiber communications systems and the resulting filtered, phase modulated, split, etc. signals must be coupled back into the same or other optical fibers with a minimum of insertion loss. Such coupling requires precise (generally sub-micron) angular and positional alignment of optical fibers and other optical components during manufacture. Further, this precise alignment must be maintained, without slippage or shift, during the attachment of various optical components and housings to one another and, subsequently, during the service lifetime of the optical components or systems.

Figure 1:
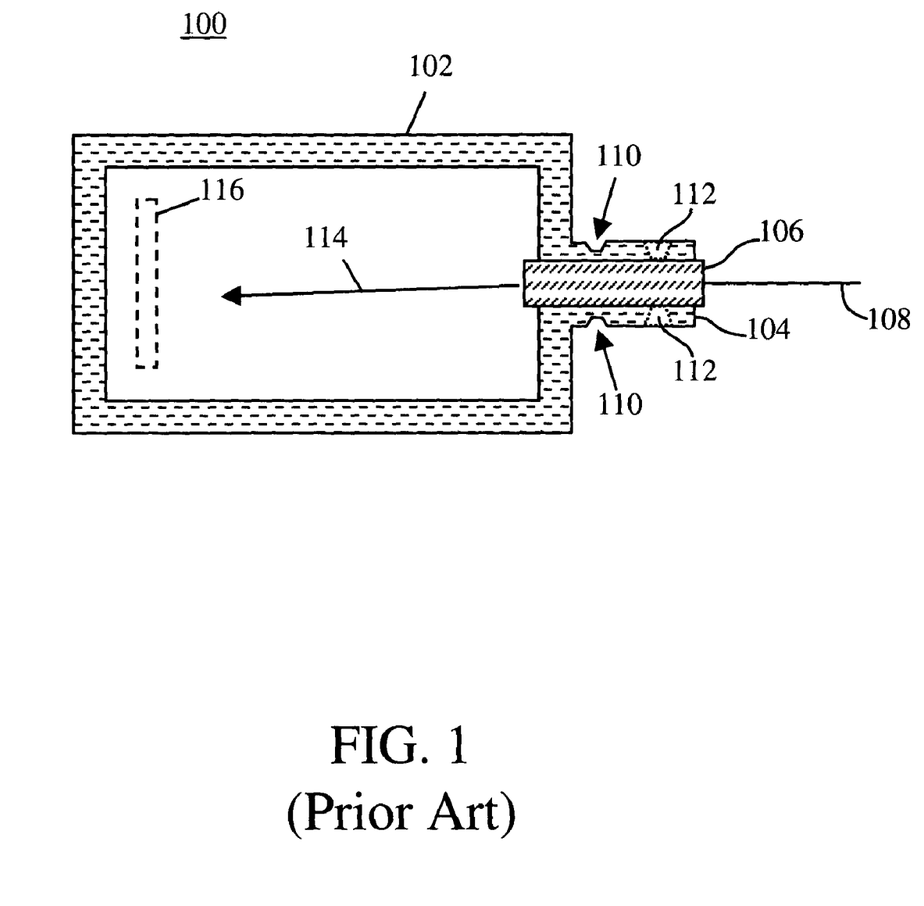
FIG. 1. an illustration of a conventional fiber optic housing and aligning device.

FIG. 1. shows a conventional fiber optic housing and aligning device. The prior art fiber optic housing and aligning device comprises a housing 102 containing an optical component 116 and comprising a tubular snout 104. The tubular snout 104 provides support and alignment for an optical collimator device 106 that is optically coupled to the optical component 116. The optical collimator 106 is further optically coupled to an optical fiber 108 and may either provide an optical signal 114 to the optical component 116 or receive the optical signal 114 from the optical component 116 or both.

The tubular snout 104 comprises a plurality of apertures 112 that are utilized for soldering the snout 104 to the collimator 106 after initial alignment of the collimator within the snout 104. The snout 104 may comprise one or more thinned regions 110 that are more easily deformed than the main body of the snout 104. A preliminary optical alignment of the collimator 106 with respect to the optical component 106 is performed prior to soldering or affixing with epoxy or other adhesive. The collimator 106 is then fixed in place relative to the snout 104 by applying solder, epoxy or some other adhesive to the apertures 112.

Precise optical alignment is problematical during manufacture of the conventional fiber optic housing and aligning device. Uneven heating or cooling of the tubular snout during soldering or unequal solder mass distribution amongst the apertures will generally cause some post-soldering positional shift of the collimator. This post-soldering shift will generally degrade the quality of the optical coupling between the collimator 106 and the optical component 116. This post-soldering shift must then be compensated by mechanical deformation of the snout 104. This mechanical deformation may be accomplished by bending or twisting the thinned portions 110 so as to compensate for the shift and restore optimal optical coupling between the collimator and the optical component. Alternatively, the magnitude of the post-soldering shift may be estimated beforehand and a compensating mis-alignment may be applied prior to soldering.

The post-soldering mechanical deformation required to optically align the conventional fiber optic housing and aligning device is difficult to precisely control and, thus, can lead to poor manufacturing yield. Also, the soldering of parts within the illustrated and other conventional fiber optic housing and aligning devices can lead to unequal or asymmetric solder distribution around the device. This uneven solder mass distribution can lead to uneven thermal expansion and/or contraction that during normal environmental changes during the service lifetime of the apparatus. These uneven thermal effects can lead, in turn, to gradual loss of optical alignment. There is therefore a need for an improved method and apparatus for a fiber optic housing and aligning device that does not suffer from these disadvantages.

SUMMARY OF THE INVENTION

The present invention discloses an apparatus and method for a fiber optic housing and aligning device. A first preferred embodiment of a fiber optic housing and aligning device in accordance with the present invention comprises a housing, a directionally adjustable tubular casing that is mechanically coupled to a wall of the housing, and a collimator disposed within the directionally adjustable tubular casing, wherein the adjustable tubular casing comprises a convex spherical cap surface that mates with a concave seating surface of an opening within the wall and wherein the spherical cap surface may be laser welded to the housing.

A second preferred embodiment of a fiber optic housing and aligning device in accordance with the present invention comprises a housing, a directionally adjustable tubular casing that is mechanically coupled to a wall of the housing, and a collimator disposed within the directionally adjustable tubular casing, wherein the housing comprises a convex spherical cap surface that mates with a concave seating surface of the directionally adjustable tubular casing, wherein an end point of the collimator is disposed at the center of a sphere defining the convex spherical cap surface and wherein the spherical cap surface may be laser welded to the directionally adjustable tubular casing.

A third preferred embodiment of a fiber optic housing and aligning device in accordance with the present invention comprises a housing, a directionally adjustable tubular casing that is mechanically coupled to a first wall of the housing, a moveable tubular casing that is mechanically coupled to a second wall of the housing, a first collimator disposed within the directionally adjustable tubular casing and a second collimator disposed within the moveable tubular casing, wherein the adjustable tubular casing comprises a convex spherical cap surface that mates with a concave seating surface of an opening within the first wall and wherein the spherical cap surface may be laser welded to the housing at the side of the first wall and wherein the moveable tubular casing comprises a flange section that mates with and may be laser welded to the second wall.

A fourth preferred embodiment of a fiber optic housing and aligning device in accordance with the present invention comprises a housing, a directionally adjustable tubular casing that is mechanically coupled to a first wall of the housing, a moveable tubular casing that is mechanically to a second wall of the housing, a first collimator disposed within the directionally adjustable tubular casing and a second collimator disposed within the moveable tubular casing, wherein the first wall comprises a convex spherical cap surface that mates with a concave seating surface of the directionally adjustable tubular casing, wherein an end point of the first collimator is disposed at the center of a sphere defining the convex spherical cap surface, wherein the spherical cap surface may be laser welded to the directionally adjustable tubular casing and wherein the moveable tubular casing comprises a flange section that mates with and may be laser welded to the second wall.

A first preferred method for a fiber optic housing and aligning device in accordance with the present invention comprises the steps of: (a) inserting a collimator into a directionally adjustable tubular casing and mechanically coupling the directionally adjustable tubular casing to a housing, wherein one of the directionally adjustable tubular casing and the housing comprises a convex spherical cap surface and the other one of the directionally adjustable tubular casing and the housing comprises a concave seating surface that mates with the convex spherical cap surface; (b) monitoring the power contained within an optical signal while adjusting the directional alignment of the directionally adjustable tubular casing with respect to the housing and the position of collimator within the adjustable tubular casing so as to maximize the signal; (c) affixing the collimator to the directionally adjustable tubular casing and laser welding the directionally adjustable tubular casing to the housing; and (d) adjusting the position of the tubular casing with respect to the housing by laser hammering, if necessary, so as to maximize the power of the optical signal.

A second preferred method for a fiber optic housing and aligning device in accordance with the present invention comprises the steps of: (a) inserting a collimator into a directionally adjustable tubular casing and mechanically coupling the directionally adjustable tubular casing to a housing, wherein one of the directionally adjustable tubular casing and the housing comprises a convex spherical cap surface and the other one of the directionally adjustable tubular casing and the housing comprises a concave seating surface that mates with the convex spherical cap surface; (b) monitoring the power contained within an optical signal while adjusting the directional alignment of the directionally adjustable tubular casing with respect to the housing and the position of collimator within the adjustable tubular casing so as to maximize the signal; (c) affixing the collimator to the directionally adjustable tubular casing and laser welding the directionally adjustable tubular casing to the housing while adjusting the optical alignment by laser hammering.

DETAILED DESCRIPTION

The present invention provides an apparatus and a method for a fiber optic housing and aligning device. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the apparatus and method for a fiber optic housing and aligning device of the present invention, the reader is referred to the appended FIGS. 2–7 in conjunction with the following description.

Figure 2:
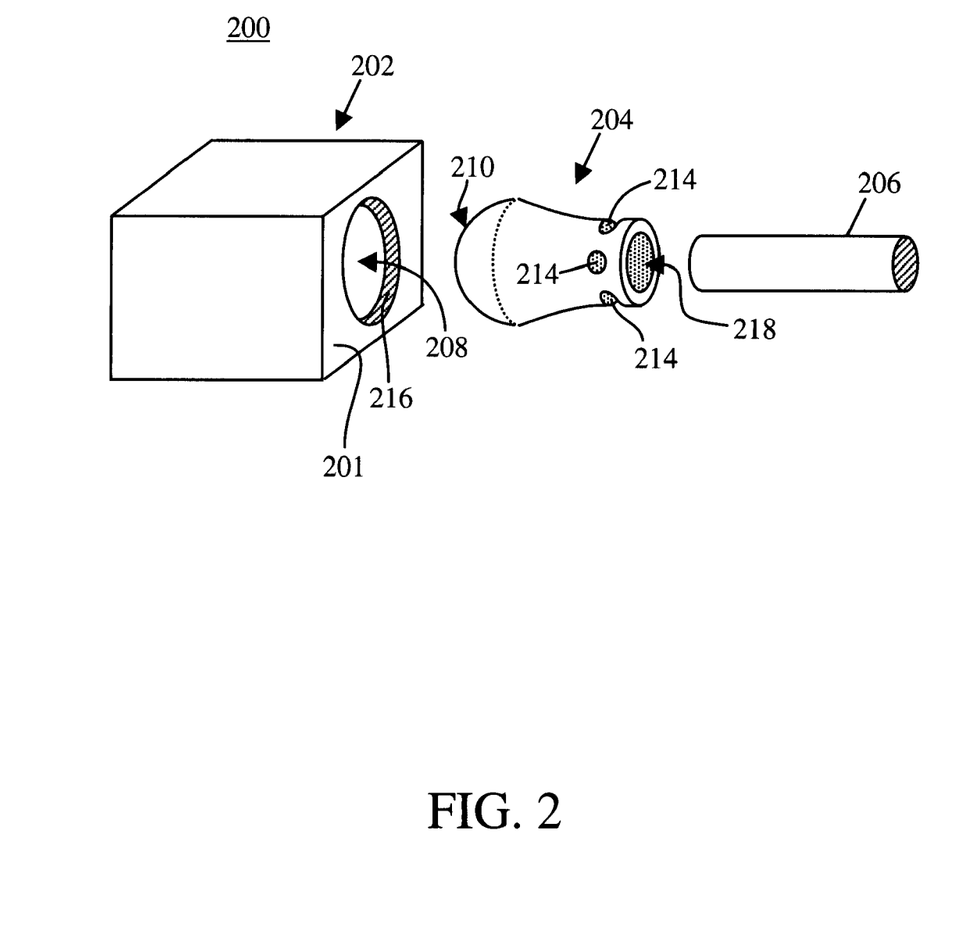
FIG. 2 is an exploded-view diagram of a first preferred embodiment of a fiber optic housing and aligning device in accordance with the present invention.

FIG. 2 shows an exploded-view diagram of a first preferred embodiment of a fiber optic housing and aligning device in accordance with the present invention. The fiber optic housing and aligning device 200 shown in FIG. 2 comprises a housing 202 that is mechanically coupled to a directionally adjustable tubular casing 204. The directionally adjustable tubular casing 204 is a holder or housing for an optical collimator 206 and comprises a convex surface 210 that has the shape of a portion of a sphere (i.e., a spherical cap) and that mates with a concave seating surface 216 of an opening 208 within a wall 201 of the housing 202. Geometrically, the concave seating surface 216 also comprises a portion of a sphere and mates with the convex surface 210 such that the angular position, relative to the housing 202, of the adjustable tubular casing 204 may be adjusted within the opening 208 while the surfaces 210, 216 are kept in contact with one another. The adjustable tubular casing comprises a hollow bore 218 that houses an optical collimator 206 and may comprise a plurality of apertures 214 for applying an adhesive material that bonds the collimator 206 to the adjustable tubular casing 204.

Figure 3A:
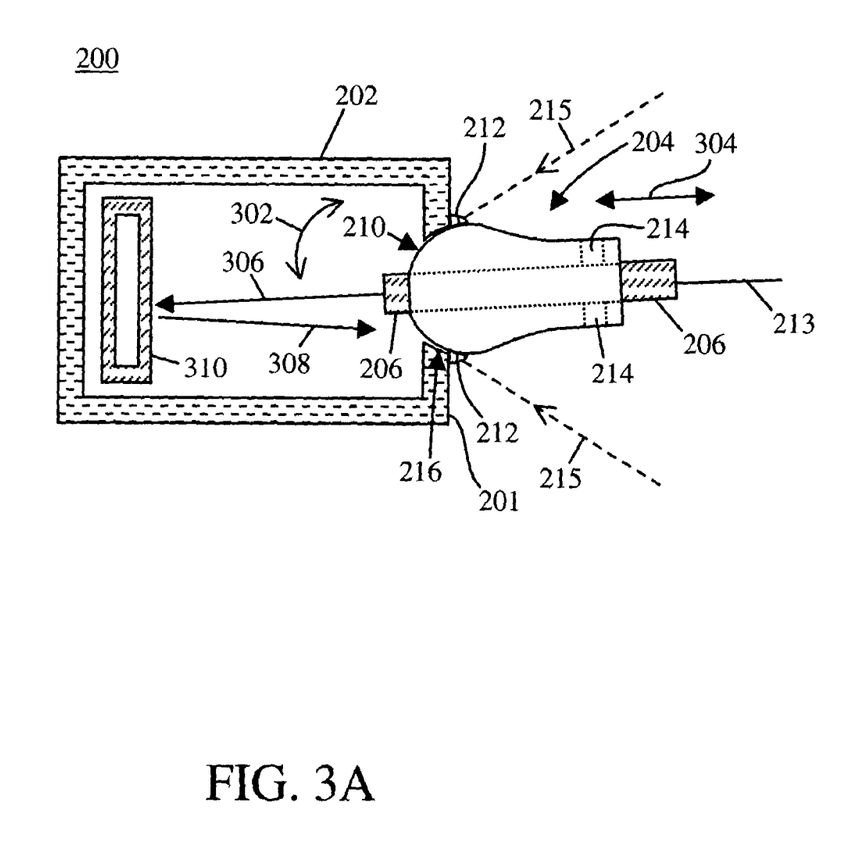
FIG. 3A is a cross-sectional diagram of the fiber optic housing and aligning device shown in FIG. 2.

FIG. 3A is a cross-sectional diagram of the fiber optic housing and aligning device 200 showing an optical component 310 contained within the housing 202 and showing the manner of utilizing the adjustable tubular casing 204 for adjusting the pointing alignment of an optical signal 306 with respect to the optical component 310. For instance, the optical component 310 may comprise a reflective or partially reflective device that returns a reflected signal 308 back to the collimator 206. One example of such a device is a reflective interferometer. A second example of such a device is a partially reflective thin-film filter optical filter such as a band pass filter. In such a situation, slight angular misalignment of the optical component 310 will cause failure of proper return of the reflected signal 308 back to the collimator 206.

The collimator 206 receives an optical signal from an optical fiber 213 and produces a collimated signal 306 that is directed towards the optical component 310. To properly point the collimated signal 306 with respect to the optical component 310, so that the reflected signal 308 returns to the collimator and then to the fiber 213, the surface 210 of the adjustable tubular casing 204 containing the collimator 206 is rotated within or against the concave seating surface 216 comprising the opening 208 (FIG. 2). A representative rotational adjustment is shown as arc 302 in FIG. 3A. The concave seating surface 216 is concentric with the convex spherical cap surface 210 of the adjustable tubular casing 204 such that the adjustable tubular casing 204 maintains firm contact with the housing and does not move laterally during such rotational adjustment. Concurrently, the depth of penetration of the collimator 206 into the adjustable tubular casing 204 may be changed or adjusted by sliding the collimator within the hollow bore of the adjustable tubular casing according to the adjustment direction 304. The adjustable tubular casing, collimator, and/or housing may be temporarily secured within an adjustable alignment fixture (not shown) during these adjustments. Once the collimator is in the correct position within the adjustable tubular casing 204, a suitable adhesive, such as solder or epoxy may be applied to the apertures 214 so as to permanently bond the collimator in place.

Once the pointing of the beam 306 is optimized with respect to the optical component 310, the adjustable tubular casing 204 is permanently secured to the housing 202 by laser welding the adjustable tubular casing 204 to the housing 202 at a number of spots around the circumference of the opening 208. The welding may be performed at points at which the convex surface 210 contacts the adjustable tubular casing 204. Laser welding apparatus for this purpose is readily available commercially from a number of vendors. Each laser weld produces localized heating of only a single spot whose mass is small relative to that of either the housing or the adjustable tubular casing. Thus, the adjustable tubular casing may be laser welded to the housing with very little thermal distortion and subsequent post-weld shift of the components.

The geometry of the design of the present invention permits oblique access of a sequence of high-energy pulsed laser beams 215 to various points around the substantially circular contact zone between the concave spherical cap surface 210 and either the wall 201 and/or the concave seating surface 216 (FIG. 3). Preferably the laser beams 215 are those produced by a pulsed laser, such as a Nd:YAG laser. Each pulse produces a weld nugget 212 at a spot along this contact zone to help secure the adjustable tubular casing 204 to the housing 202. Preferably, between four and forty such weld spots are produced around this contact zone. The geometry of the weld spots may be determined by a laser hammering technique, which is described in greater detail in the following discussion, to maintain optical alignment during laser welding.

Figure 3B:
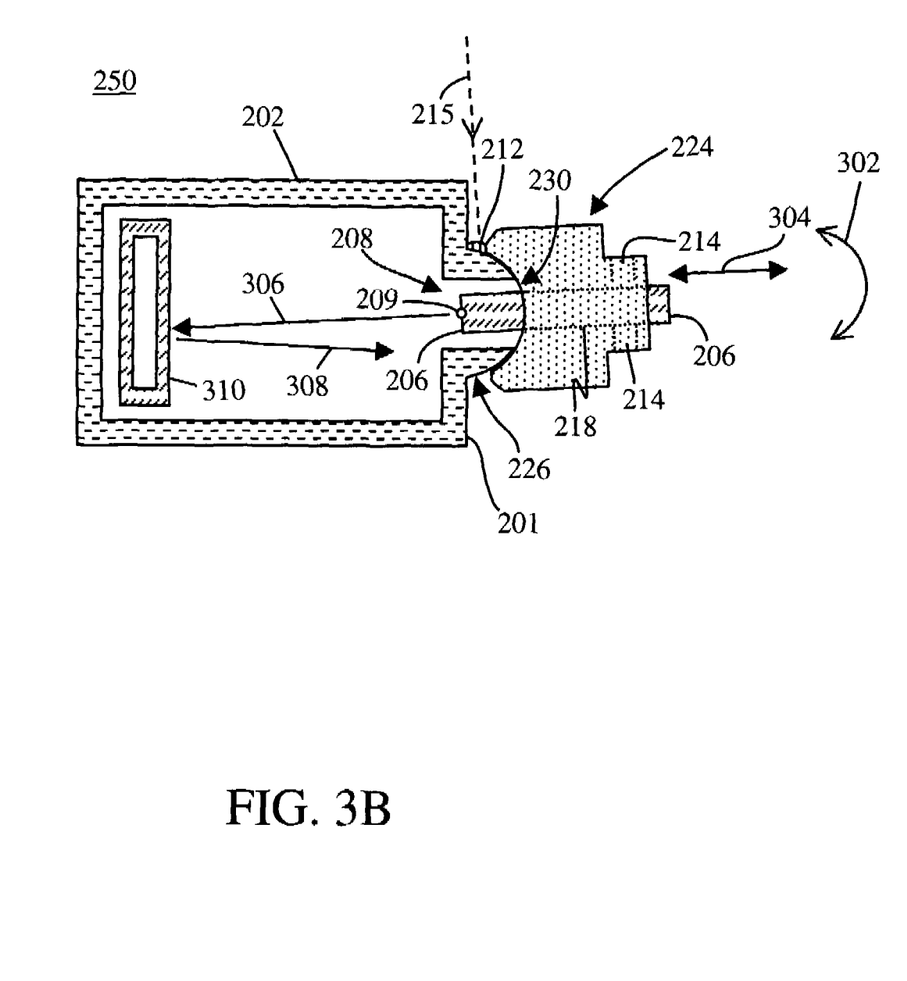
FIG. 3B is a cross-sectional diagram of a second preferred embodiment of a fiber optic housing and aligning device in accordance with the present invention.

FIG. 3B is a cross-sectional diagram of a second preferred embodiment of a fiber optic housing and aligning device in accordance with the present invention. The fiber optic housing and aligning device 250 shown in FIG. 3B comprises a housing 202 that is mechanically coupled to a directionally adjustable tubular casing 224 of different form to that described above. A wall of the housing 202 comprises a convex surface 226 that has the shape of a portion of a sphere (i.e., a spherical cap) and that surrounds an opening 208 in the wall and that mates with a concave seating surface 230 of the directionally adjustable tubular casing 224. The directionally adjustable tubular casing comprises a hollow bore 218 that houses an optical collimator 206 and may comprise a plurality of apertures 214 for applying an adhesive material that bonds the collimator 206 to the adjustable tubular casing 224.

The use of the fiber optic housing and aligning device 250 (FIG. 3B) is generally similar to that of the fiber optic housing and aligning device 200 shown in FIG. 3A and already described. Therefore, FIG. 3B also illustrates an optical signal 306, a reflected signal 308, an optical component 310, an adjustment direction 302, an adjustment direction 304, a laser beam 215 for laser welding and a weld nugget 212, all of which have the same respective meanings as those already described in reference to FIG. 3A. Once the direction of the adjustable tubular casing is 224 is correct, the adjustable tubular casing 224 may be laser welded to the housing 202. The welding may be performed at points at which the convex surface 226 contacts the adjustable tubular casing 224.

The design of the fiber optic housing and aligning device 250 particularly facilitates maintaining an end of the optical collimator 206 at the geometric center 209 of the spherical cap surface 226. As a result, with the end of the collimator 206 positioned at the point 209, the adjustment of the angle of the adjustable tubular casing 224 by relative movement of the two mating surfaces 216 and 210 does not cause movement of the end of the collimator 206 away from the point 209. This property is advantageous in circumstances in which the collimator 206 must be maintained in a stable position relative to the optical component 310.

Figure 4:
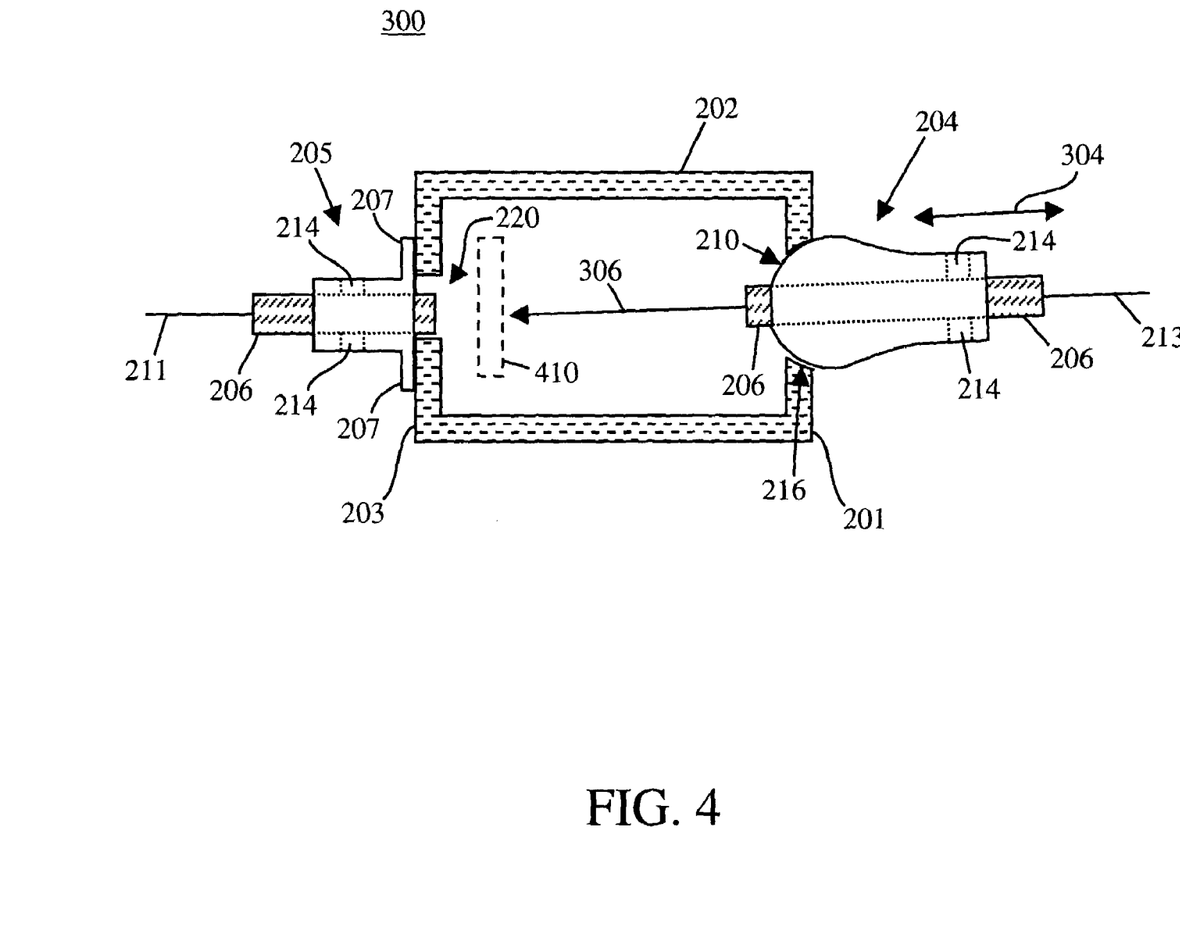
FIG. 4 is a cross-sectional illustration of a third preferred embodiment of a fiber optic housing and aligning device in accordance with the present invention.

FIG. 4 shows a cross-sectional diagram of a third preferred embodiment of a fiber optic housing and aligning device in accordance with the present invention. The fiber optic housing and aligning device 300 shown in FIG. 4 is utilized in applications in which an optical signal 306 must be optically propagated from a first collimator to a second collimator at the opposite side of the housing 202. The optical signal may pass through a transmissive or partially transmissive optical component 410, such as, for instance an optical filter, contained within the housing 202.

The fiber optic housing and aligning device 300 comprises a housing 202 and a directionally adjustable tubular casing 204 that mates with and is adjusted relative to the wall 201 of the housing 202 as previously described. The directionally adjustable tubular casing 204 is a holder or housing for an optical collimator 206 that is optically coupled to an input optical fiber 213. Although, in FIG. 4, the adjustable tubular casing 204 is shown comprising a convex surface 210 and the wall of the housing 202 is shown with a convex seating surface 216, it will be readily appreciated that that the convexity and concavity of these two mating surfaces may be changed, in a fashion similar to that described in reference to FIG. 3B, so as to provide a fourth preferred embodiment (not specifically illustrated) of an apparatus in accordance with the present invention.

The fiber optic housing and aligning device 300 (FIG. 4) further comprises a moveable tubular casing 205 that mates with and is adjusted relative to an opposite wall 203 of the housing 202. The moveable tubular casing 205 may house a second collimator 206 and comprises one or more apertures 214 as well as a flange 207 that may slide against the wall 203. Instead of a collimator, the moveable tubular casing may house some other type of optical component that can receive light signals. If present, the collimator housed within the tubular casing 205 is optically coupled to an output optical fiber 211.

The collimator 206 receives an optical signal from the input optical fiber 213 and produces a collimated signal 306 that is directed towards and through the optical component 410. Subsequently, the collimated signal passes in the direction of the second collimator 206 housed within the moveable tubular casing 205. An opening 220 within the wall 203 of housing 202 permits translation movement of the moveable tubular casing 205 and the collimator housed therein with respect to the collimated optical signal 306. This translation adjustment permits the collimator 206 within the moveable tubular casing 205 to be properly laterally positioned so as to receive the collimated signal 306. Additionally, the propagation direction of the collimated signal 306 must be oriented so as to be accepted by the collimator 206 within the moveable tubular casing 205. This pointing direction adjustment of the collimated signal 306 is accomplished by rotating the adjustable tubular casing 204 within the concave seating surface 216 as previously described. By both adjusting the adjustable tubular casing 204 and the moveable tubular casing 205, the optical signal 306 may be properly optically coupled into the second optical collimator and the output fiber 211. Once the pointing of the signal 306 and the position of the moveable tubular casing 205 are correct, the directionally adjustable tubular casing 204 and the moveable tubular casing 205 are secured to the housing by laser welding the directionally adjustable tubular casing 204 to the housing 202 and laser welding the flange 207 to the wall 203 of the housing 202.

Figure 5:
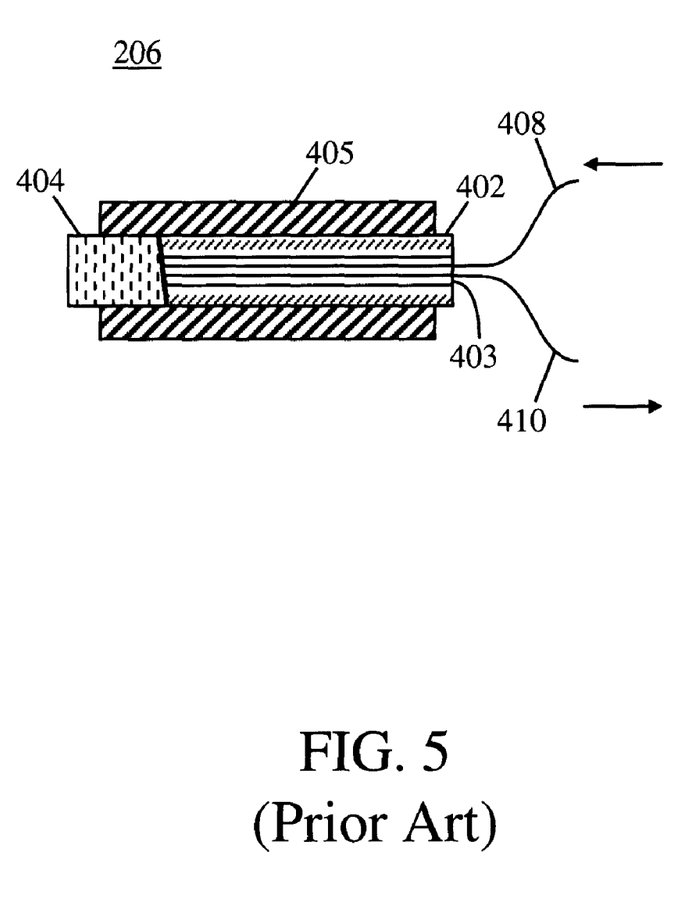
FIG. 5 is an illustration of a fourth preferred embodiment employing a collimator that may be used within a fiber optic housing and aligning device in accordance with the present invention.

The term "collimator", as used herein, refers to any optical lens or lens assembly, either with or without a support or housing, that either (a) receives diverging light from an optical fiber and transforms this diverging light into a substantially collimated light beam or (b) receives a light comprising a substantially collimated light beam and optically couples this light into an optical fiber by focusing it onto an end facet of the fiber. FIG. 5 shows an example of a known collimator that may be used within a fiber optic housing and aligning device in accordance with the present invention. The collimator 206 shown in FIG. 5 comprises an inner tube 402 (or other similar supporting or housing mechanism) comprising a hollow bore 403. The hollow bore 403 of the inner tube 402 is of an appropriate diameter so as to house at least a first fiber optical 408 and, optionally, a second optical fiber 410. The first fiber 408 and optional second fiber 410 are optically coupled to a one-quarter pitch Gradient Index (GRIN) lens 404. The inner tube 402 and the GRIN lens 404 are housed within an outer tube 405. The outer tube maintains the relative positions of the inner tube 402 and the GRIN lens 404. Both the inner and the outer tubes may comprise metal, glass or glass with one or more metallized surfaces.

Through the well known operation of GRIN lenses, a light received from either the fiber 408 or the fiber 410 is transformed into a substantially collimated beam. Conversely, a substantially collimated beam received by the GRIN lens 404 from the side of the GRIN lens 404 opposite to the fiber(s) 408–410 may be focused into the fiber 408 or into the fiber 410. If the collimator 206, as shown in FIG. 5, is utilized within the fiber optic housing and aligning device 200 (FIG. 3), then the first fiber 408 may be used to provide the signal 306 and the second fiber 410 may be used to receive the reflected signal 308. Alternatively, if only the single fiber 408 is utilized within the collimator 206, then the fiber 408 may be used to both provide the signal 306 and to receive the signal 308.

Figure 6:
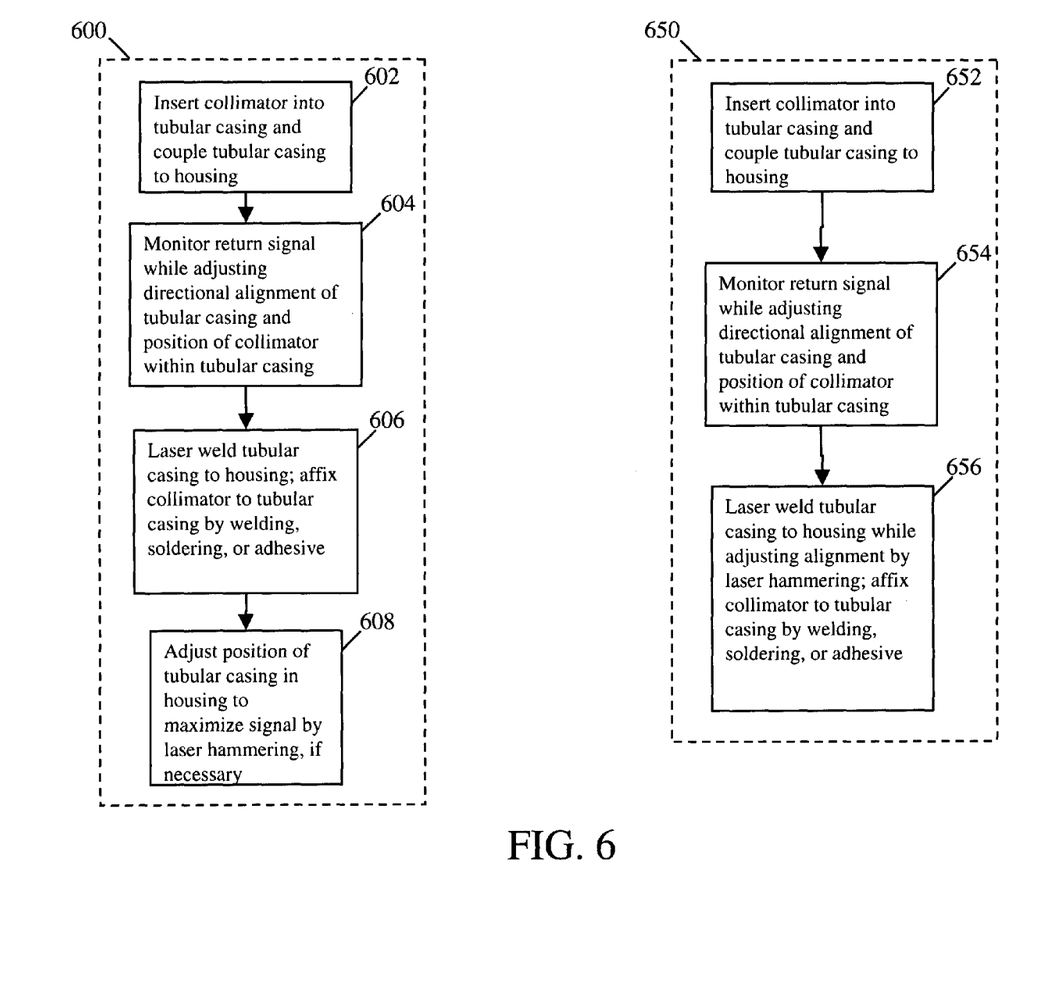
FIG. 6 is a diagram of first and second methods, in accordance with the present invention, for aligning an optical collimator relative to an optical component utilizing a fiber optic housing and aligning device.

FIG. 6 provides flow diagrams of a first preferred method 600 and of a second preferred method 650, in accordance with the present invention, for aligning an optical fiber relative to an optical component utilizing a fiber optic housing and aligning device. The method 600 comprises, in sequence, a first step 602 comprising inserting a collimator into a directionally adjustable tubular casing comprising either a convex spherical cap surface or a concave seating surface and coupling the tubular casing to a housing comprising a surface that mates with the concave or convex surface of the tubular casing; a second step 604 comprising monitoring the power contained within an optical signal while adjusting the directional alignment of the tubular casing and the position of collimator within the tubular casing so as to maximize the signal power; a third step 606 comprising laser welding the tubular casing to the housing and affixing the collimator to the tubular casing; and a final optional step 608 comprising adjusting the position of the tubular casing relative to the housing by laser hammering, if necessary, so as to compensate for any post-weld shift and re-maximize the power of the optical signal.

The first step 602 of the method 600 (FIG. 6) comprises basic initial assembly of components within a fiber optic housing and aligning device as previously described herein. The second step 604 comprises initial alignment of components so as to maximize the monitored optical power of an optical signal propagating through a fiber optic housing and aligning device. For instance, the optical power of the reflected signal 308 returning back to the collimator 206 of the apparatus 200 (FIG. 3A) may be monitored. The optimal optical alignment would then be the one that yields maximum strength of the monitored signal 308. The step 604 may be accomplished with the aid of precision alignment fixtures to hold the parts in place and adjust their positions prior to welding.

The third step 606 of the method 600 comprises securing of the optimal position of the components determined in step 604 through the acts of: (a) laser welding the tubular casing to the housing so as to secure the position of the directionally adjustable tubular casing relative to the housing and (b) securing the collimator to the tubular casing by the application of solder, epoxy or other adhesive material to apertures in the tubular casing or to other contact points between the tubular casing and the collimator. The final step 608 of the method 600 comprises optional compensation for any such post-weld shift of the optical alignment–determined by degradation of the signal strength relative to that noted in step 604–through the known method of laser hammering. Laser hammering is further described with respect to the second method 650 discussed in the following.

A second preferred method 650 for a fiber optic housing and aligning device in accordance with the present invention is also outlined in FIG. 6. The method 650 comprises a first step 652 that is identical to the step 602 of the method 600 and a second step 654 that is identical to the step 604 of the method 600. The method 650 further comprises a third step 656 that comprises affixing the collimator to the tubular casing and laser welding the tubular casing to the housing whilst simultaneously adjusting the optical alignment by laser hammering. Within the method 650, the welding and laser hammering positional alignments are performed in the single step 656. Therefore, there is no need for an extra alignment compensation step.

Figure 7:
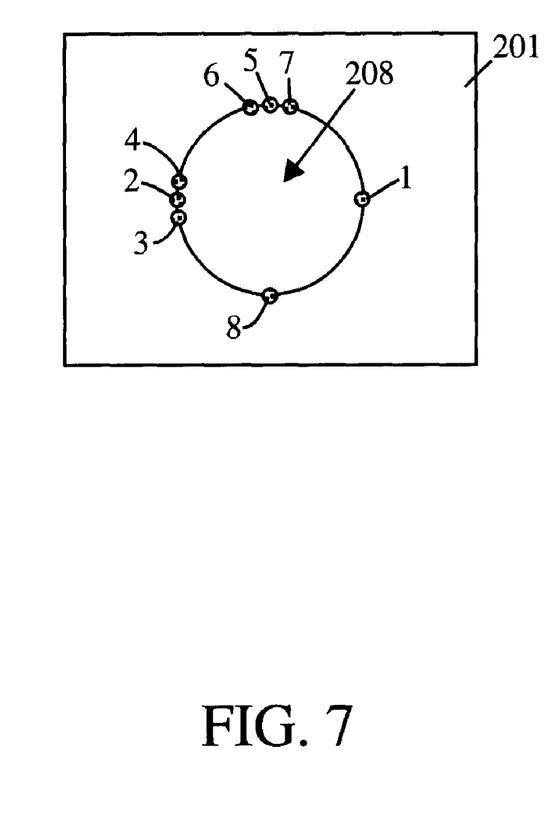
FIG. 7 is a diagram of a hypothetical pattern of welds between a directionally adjustable tubular casing and a housing according to a method in accordance with the present invention.

FIG. 7 illustrates, in greater detail, a pattern of welding of a tubular casing to a housing using the laser hammering technique noted in step 656 of the method 650. FIG. 7 provides an end view of a fiber optic housing and aligning device showing only the wall 201 and the opening 208 within the wall 201. Other components of the device are not shown. The spots 1–8 represent a hypothetical set of laser welds of the tubular casing to the housing along the wall 201, wherein the numerical designations of the welds correspond to a hypothetical sequence of welds utilized in the laser hammering technique of the step 656 of method 650.

Referring to FIG. 7 as well as to step 656 of method 650 (FIG. 6), assume that weld 1 is the first welded spot and that the weld 1 causes a slight positional change—or post-weld shift—that causes signal degradation, relative to the optimal alignment determined in step 654. As is generally understood, such post-weld shift is caused by stresses set up by differential thermal contraction of non-equivalent welded parts as the weld nugget cools. Because of the present geometry of the adjustable tubular casing within the housing, this movement is largely constrained to possible slight angular rotation of the tubular casing within the concave seating surface (if present) of the housing or, alternatively, against the convex spherical cap surface (if present) of the housing. Therefore, to compensate for the rotational post-weld shift, additional welds 2–4 are made at the diametrically opposite portion of the opening 208 until the monitored signal level returns to near its maximum value. Then, as part of the continued welding, assume that weld 5 is the next welded spot, in sequence, and that, as an effect of this weld, the optical alignment changes such that the signal strength improves somewhat. Therefore, additional welds 6–7 are made in the vicinity of weld 5, so as to augment this beneficial alignment change until no further improvement in signal power is noted. Subsequently, the weld 8, diametrically opposite to weld 5, is the next weld in sequence. This interactive process continues until the number of welds located along the circumference of the opening 208 is adequate to provide the necessary structural strength and rigidity to the attachment. The above-noted sequence of welds is provided for example purposes only. The actual sequence and positions of welds will vary according to the particular requirements of the pieces being welded as well as to operational parameters of the welding equipment, etc.

Figures 8A, 8B:
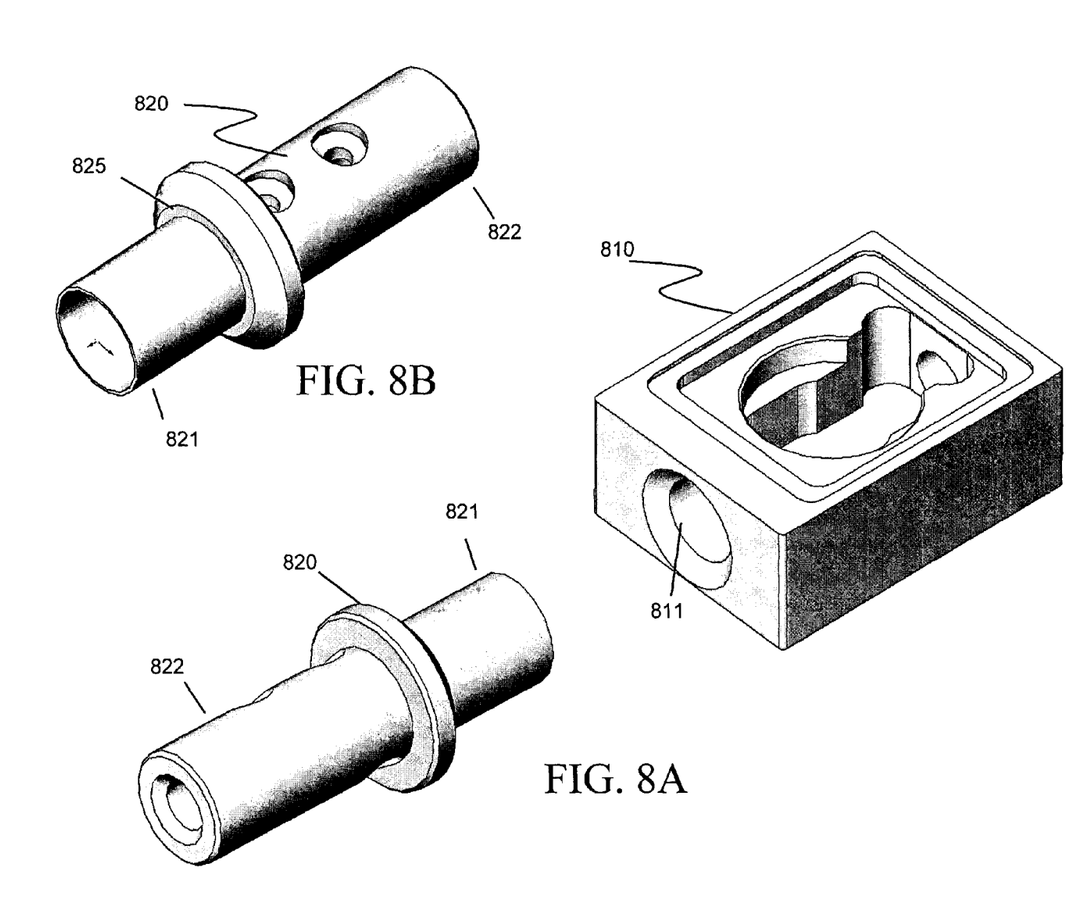
FIG. 8A is a diagram of a fifth preferred embodiment of a fiber optic housing and aligning device in accordance with the present invention.
FIG. 8B is a diagram showing the aligning device with a circular ring shape that has a round-shape curvature surface in accordance with the present invention.
Figure 9:
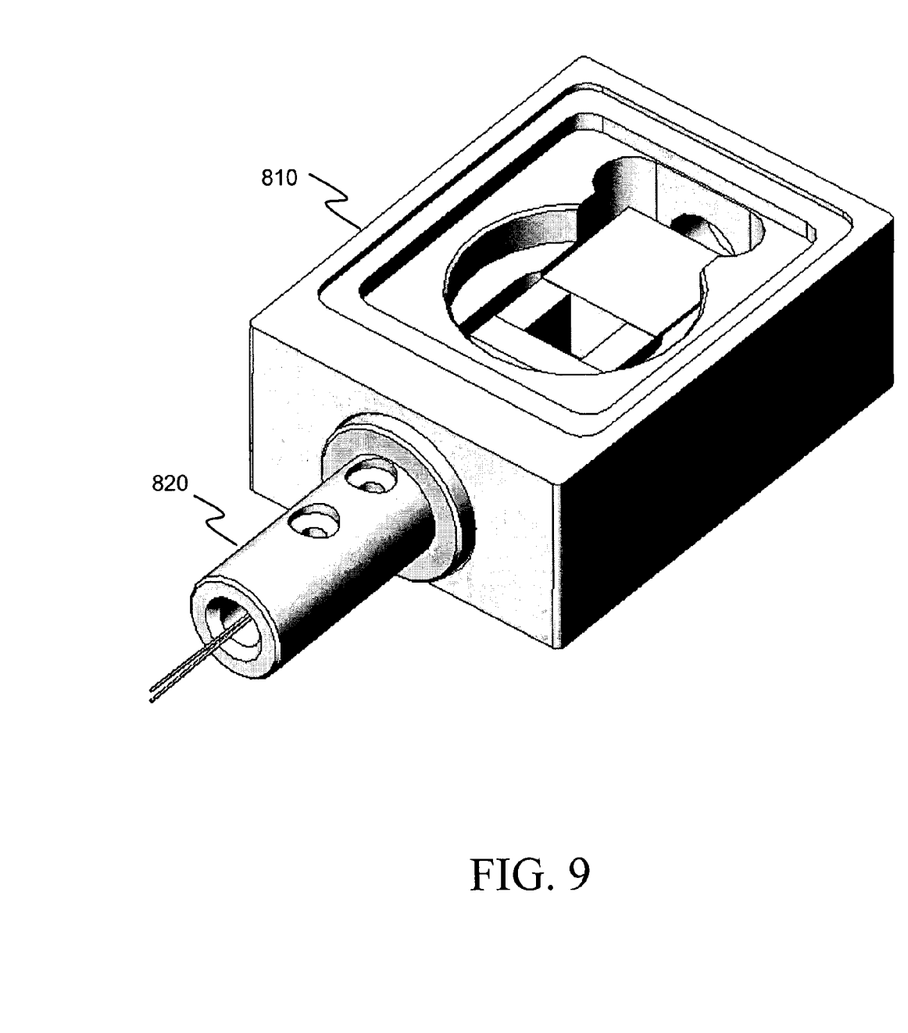
FIG. 9 is a diagram of an assembled fiber optic housing and aligning device of the fifth preferred embodiment in accordance with the present invention.

FIG. 8A is a diagram of a fifth preferred embodiment of a fiber optic housing 810 and an aligning device 820 that are attached by using epoxy. The aligning device 820, which is also referred to as a collimator holder, has a cylindrical body shape with a circular ring shape around the cylindrical body. The cylindrical body shape of the aligning device 820 has a front end 821 and a back end 822. The circular ring shape of the aligning device 820 has a front end and a back end in which the front end has a round-shape curvature surface 825 (as shown in FIG. 8B) that is suitable for matching a mating curved surface of an opening 811 in the fiber optic housing 810. An UV curable epoxy is used for temporary fixing the collimator alignment between the aligning device 820 and the fiber optic housing 810. After removing from a fixture, epoxy is applied to the aligning device 820 and the joint on the fiber optic housing 810. Subsequently, the fiber optic housing 810 and the aligning device 820 are put in an oven for baking, which results in the attachment of the aligning device 820 to the fiber optic housing 810, as shown in FIG. 9. This embodiment advantageously provides a more manufacturable, cost-effective, and reworkable solution.

One of ordinary skill in the art should recognize that other attachment or adhesive techniques for holding the fiber optic housing and aligning device, in addition to the laser welding and epoxy, can be practiced without departing from the spirits of the present invention.

An apparatus and method for an improved fiber optic housing and aligning device have been disclosed. Although the present invention has been disclosed in accordance with the embodiments shown, one of ordinary skill in the art will readily recognize that there could be variations to the embodiments and those variations would be within the spirit and scope of the present invention.

We claim:

1. A fiber optic housing and aligning device, comprising:
   a housing;
   a directionally adjustable tubular casing that is mechanically coupled to a wall of the housing; and
   a collimator disposed within the directionally adjustable tubular casing,
   wherein:
   the housing comprises a convex spherical cap surface that mates with a concave seating surface of the directionally adjustable tubular casing,
   an end point of the collimator is disposed at the center of a sphere defining the convex spherical cap surface, and
   the spherical cap surface is configured to be attached to the directionally adjustable tubular casing by an attachment means.

2. The device of claim 1, wherein the attachment means comprises a laser weld.

3. The device of claim 1, wherein the attachment means comprises an epoxy bond.

4. A fiber optic housing and aligning device, comprising:
   a housing;
   a directionally adjustable tubular casing that is mechanically coupled to a first wall of the housing;
   a moveable tubular casing that is mechanically coupled to a second wall of the housing;
   a first collimator disposed within the directionally adjustable tubular casing and a second collimator disposed within the moveable tubular casing,
   wherein:
   the first wall comprises a convex spherical cap surface that mates with a concave seating surface of the directionally adjustable tubular casing,
   an end point of the first collimator is disposed at the center of a sphere defining the convex spherical cap surface,
   the spherical cap surface is configured to be attached to the directionally adjustable tubular casing by an attachment means, and
   the moveable tubular casing comprises a flange section that mates with and is configured to be attached to the second wall by the attachment means.

5. The device of claim 4, wherein the attachment means comprises a laser weld.

6. The device of claim 4, wherein the attachment means comprises an epoxy bond.

7. A method for a fiber optic housing and aligning device, comprising:
- (a) inserting a collimator into a directionally adjustable tubular casing and mechanically coupling the directionally adjustable tubular casing to a housing, wherein the housing comprises a convex spherical cap surface and the directionally adjustable tubular casing comprises a concave seating surface that mates with the convex spherical cap surface and an end point of the collimator is disposed at the center of a sphere defining the convex spherical cap surface;
- (b) monitoring the power contained within an optical signal while adjusting the directional alignment of the directionally adjustable tubular casing with respect to the housing and the position of collimator within the adjustable tubular casing so as to maximize the signal;
- (c) affixing the collimator to the directionally adjustable tubular casing and using an attachment means to attach the directionally adjustable tubular casing to the housing; and
- (d) adjusting the position of the tubular casing with respect to the housing by laser hammering so as to maximize the power of the optical signal.

8. The method of claim 7, wherein the attachment means comprises a laser weld.

9. A method for a fiber optic housing and aligning device, comprising:
- (a) inserting a collimator into a directionally adjustable tubular casing and mechanically coupling the directionally adjustable tubular casing to a housing, wherein the housing comprises a convex spherical cap surface and the directionally adjustable tubular casing comprises a concave seating surface that mates with the convex spherical cap surface and an end point of the collimator is disposed at the center of a sphere defining the convex spherical cap surface;
- (b) monitoring the power contained within an optical signal while adjusting the directional alignment of the directionally adjustable tubular casing with respect to the housing and the position of collimator within the adjustable tubular casing so as to maximize the signal; and
- (c) affixing the collimator to the directionally adjustable tubular casing and using an attachment means to attach the directionally adjustable tubular casing to the housing while adjusting the optical alignment by laser hammering.

10. The method of claim 9, wherein the attachment means comprises a laser weld.

* * * * *